United States Patent [19]

Hoshiko

[11] Patent Number: 4,966,886
[45] Date of Patent: Oct. 30, 1990

[54] SUPERCONDUCTING CABLE WITH CONTINUOUSLY POROUS INSULATION

[75] Inventor: Takeshi Hoshiko, Koganei, Japan
[73] Assignee: Junkosha Co., Ltd., Tokyo, Japan
[21] Appl. No.: 332,638
[22] Filed: Mar. 30, 1989
[30] Foreign Application Priority Data Apr. 1, 1988 [JP] Japan ............................ 63-82078

[51] Int. Cl.$^5$ ............................................. H01B 12/00
[52] U.S. Cl. .................................. 505/1; 29/599; 174/15.5; 174/125.1; 505/886; 505/887
[58] Field of Search ................... 174/15.4, 15.5, 125.1; 29/599; 505/1, 740, 741, 884, 885, 886, 887

[56] References Cited

U.S. PATENT DOCUMENTS

| | | | |
|---|---|---|---|
| 3,292,016 | 12/1966 | Kafka | 505/886 X |
| 3,301,937 | 1/1967 | Burnier et al. | 174/15.5 X |
| 3,390,703 | 7/1968 | Matlow | 174/15.5 X |
| 3,431,347 | 3/1969 | Kafka et al. | 174/15.5 X |
| 3,612,742 | 10/1971 | Snowden et al. | 174/15.5 |
| 3,749,811 | 7/1973 | Bogner et al. | 505/886 X |
| 4,394,534 | 7/1983 | Bahder et al. | 174/15.5 |
| 4,397,807 | 8/1983 | Bahder et al. | 264/512 |
| 4,647,888 | 3/1987 | Woolf et al. | 174/125.1 |
| 4,694,268 | 9/1987 | Kawamura et al. | 174/125.1 X |

FOREIGN PATENT DOCUMENTS

| | | | |
|---|---|---|---|
| 916308 | 12/1972 | Canada | 505/886 |
| 285168 | 10/1988 | European Pat. Off. | 29/599 |
| 301279 | 2/1989 | European Pat. Off. | 505/885 |
| 197803 | 3/1978 | Fed. Rep. of Germany | 174/15.5 |

OTHER PUBLICATIONS

Kumakura, H. et al.; Ba-Y-Cu-O Superconducting Tape Prepared by Surface Diffusion Process; Japanese Journal of Applied Physics; vol. 26, No. 17; Jul. 87.
Togano, K. et al.; Developments of Tape and Wire Fabrication Processes for High $T_c$ $Ba_2YCu_3O_{7-y}$ Oxide Superconductors; Mat. Res. Soc. Symp. Proc. vol. 99; 1988; Symposium 11–12/87 Boston–High-Temperature Superconductors.
Tachikawa, M. et al.; Preparation of Y-Ba-Cu Oxide Superconducting Composite Tapes by a Diffusion Process; Mat. Res. Soc. Symposium 11/12/87 Boston; vol. 99.
Shimizu, H. et al.; Tape Conductor Fabrication Processes for High-$T_c$$Ba_2YCU_3O_{7-y}$; Japaneses Journal of Applied Physics; vol. 27, No. 3, Mar. 88.
Yamada, Y. et al.; Bulk and Wire Type Y-BA-Cu Oxide Superconductor; Japanese Journal of Applied Physics; vol. 26 (1987) Supplement 26-3.

Primary Examiner—Morris H. Nimmo

[57] ABSTRACT

A ceramic wire superconducting cable is provided having porous expanded polytetrafluoroethylene insulation, a superconductive ceramic tape "conducting" layer having openings at prescribed intervals and a high strength polytetrafluoroethylene fiber protective layer. The components covering the cable are porous permitting liquid nitrogen to permeate and directly contact with the superconductive cable.

5 Claims, 1 Drawing Sheet

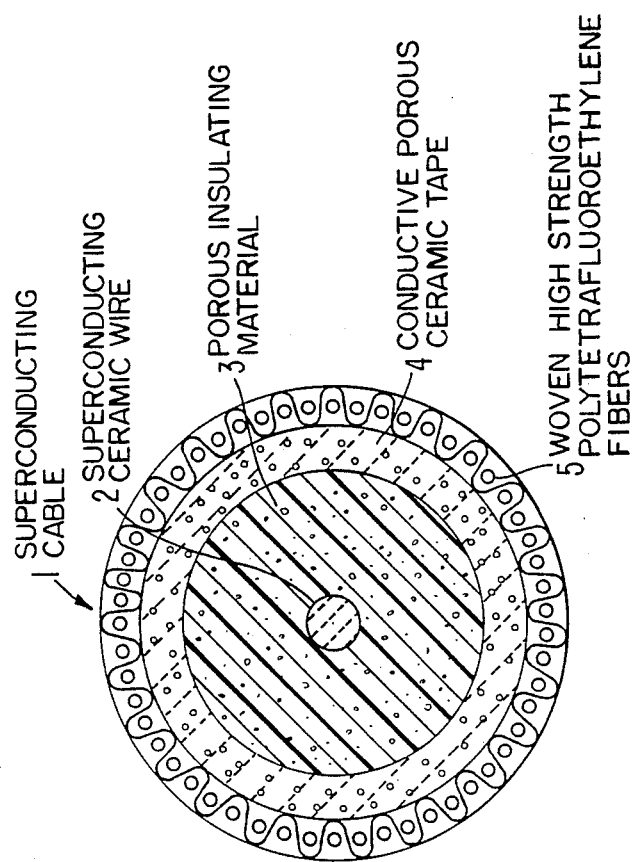

SUPERCONDUCTING CABLE WITH CONTINUOUSLY POROUS INSULATION

FIELD OF THE INVENTION

This invention pertains to superconducting electric cables comprising an insulated superconducting wire cooled by liquid nitrogen.

BACKGROUND OF THE INVENTION

Methods for cooling superconducting materials include a method in which the superconducting material is formed into a braided wire having a structure similar to that of a coaxial cable, and the coolant is sealed inside the central hollow space of the superconducting material such as that disclosed in Japanese Laid-Open Utility Model Application No. 62-66118. Conventionally, however, it has been necessary to wrap the circumference of such a superconducting material with a large amount of copper in order to maintain stable superconduction of the wire material. As a result, a vicious cycle is created in which heat is generated by the resistance arising from faults in the crystalline arrangement of the superconducting material and this heat leads to a further increase in resistance.

SUMMARY OF THE INVENTION

The present invention provides a superconducting cable in which the coolant directly contacts the superconducting material, thus absorbing heat generated by faults in the crystal structure and stabilizing the superconducting cable.

In the present invention, a superconducting cable is constructed by covering the circumference of a superconducting ceramic wire material, which can be penetrated by a coolant such as liquid nitrogen, with a continuously porous insulating material. Accordingly, the superconducting ceramic wire material is stably held by the continuously porous insulating material and at the same time the coolant permeates the continuously porous insulating material and directly contacts the superconducting ceramic wire material. As a result, the coolant penetrates into the crystalline structure of the superconductor so that any heat generated by faults in the crystalline arrangement of the ceramic material is effectively absorbed to give a stabilized superconducting cable.

BRIEF DESCRIPTION OF THE DRAWING

The FIGURE shows a cross-section of a cable of the invention with the layers indicated.

DESCRIPTION OF THE PREFERRED EMBODIMENTS

With reference to the FIGURE to give a more complete and detailed description of the invention, a superconducting cable 1 is constructed as follows. A continuously porous insulating material 3 is formed by wrapping a drawn porous tape, such as polytetrafluoroethylene tape, around the circumference of a superconducting ceramic wire material 2, such as a $YBa_2Cu_3O_x$ sinter. Next, an external conductive layer 4 is formed by wrapping a superconducting ceramic tape, which has openings formed in it at prescribed intervals, around the outside of porous insulating material 3. Finally, a protective layer 5, formed from woven high-strength tetrafluoroethylene polymer fibers, is placed on the outside of external conductive layer 4.

As a result of this method of construction, superconducting ceramic wire material 2 is firmly held by continuously porous insulating material 3, external conductive layer 4, and protective layer 5 so that it is structurally stable. Further, the liquid nitrogen coolant which surrounds superconducting cable 1 passes through the mesh of protective layer 5, the openings in external conductive layer 4, and continuously porous insulating material 3, and thus directly contacts superconducting ceramic wire material 2. Accordingly, this liquid nitrogen penetrates into the crystalline arrangement of the ceramic material so that any heat generated by faults in the crystalline structure of the ceramic material is effectively absorbed to yield a stabilized superconducting cable.

Other ceramic materials than that exemplified above may be used for wire 2 and the ceramic tape portion of layer 4, such as La-Sr-Cu-O or the like, other coolants than liquid nitrogen may be used, and porous materials 3 and protective layer 5 may be other porous or high-strength fibrous materials which will not be harmed by liquid nitrogen or another liquid coolant. However, porous polytetrafluoroethylene is the preferred material for those layers.

Other changes in materials and methods which would be obvious to those skilled in the art could be made without departing from the scope of the invention, the bounds of which are delineated in the appended claims.

I claim:

1. A superconducting cable comprising:
   (a) a superconducting ceramic wire
   (b) a porous insulating material covering said ceramic wire and
   (c) a conductive porous ceramic tape covering said porous insulating material.

2. The cable of claim 1 in which said ceramic tape is covered by a protective layer comprising woven high strength tetrafluoroethylene fibers.

3. The cable of claim 2 in which said fibers comprise porous polytetrafluoroethylene.

4. A method of cooling a superconductive cable comprising:
   contacting the cable of claim 1 said with a liquid coolant.

5. The method of claim 4 in which said liquid coolant is nitrogen.

* * * * *